H. F. Rohm,
Bee Hive.
No. 107,548. Patented Sep. 20, 1870.

Witnesses,
H. A. Daniels
J. W. Mester

Hiram F. Rohm, Inventor,
Chas. S. Whitman, Attorney,

United States Patent Office.

HIRAM F. ROHM, OF WEST PROVIDENCE, PENNSYLVANIA.

Letters Patent No. 107,548, dated September 20, 1870.

IMPROVEMENT IN BEE-HIVES.

The Schedule referred to in these Letters Patent and making part of the same.

*To all whom it may concern:*

Be it known that I, HIRAM F. ROHM, of West Providence, in the county of Bedford and in the State of Pennsylvania, have invented a new and useful Improvement in Bee-Hives, termed the "Late Cluster;" and do hereby declare that the following description, taken in connection with the accompanying drawing hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to bee-hives; and

The nature thereof consists in certain modifications in the details and improvements in the construction of the same, hereinafter set forth, whereby facilities are afforded by means of which the bees may be enabled to secure a large quantity of honey in a short time, rendering the hive suitable and preferable for late "swarms," and the removal of the internal parts of the hive facilitated, enabling the contents thereof to be readily removed.

In the accompanying drawing, which illustrates my invention and forms a part of the specification thereof—

Figure 1:
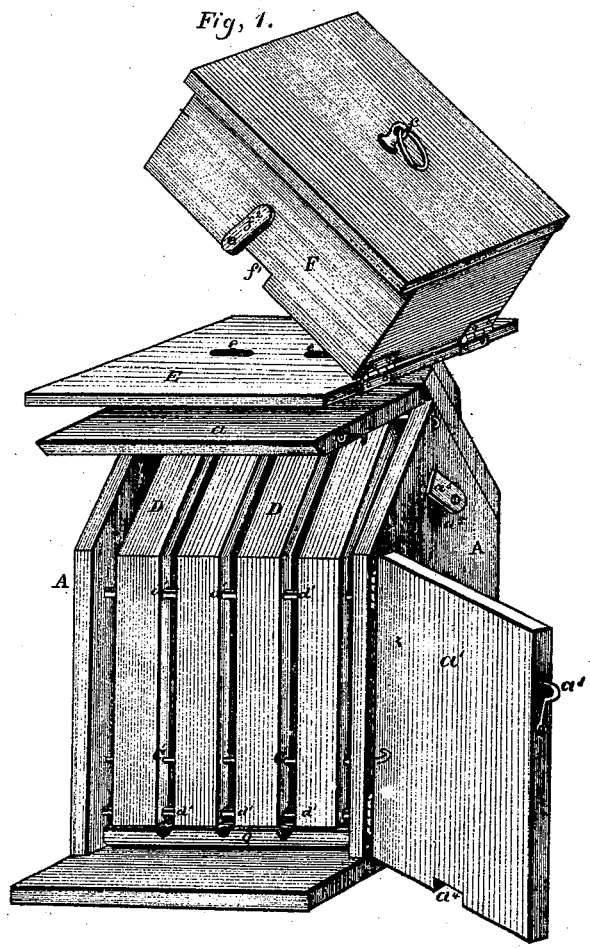
Figure 2:
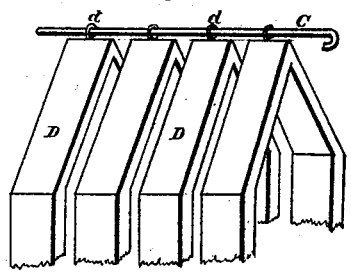

Figure 1 represents a view, in perspective, of my bee-hive, with the doors thereof thrown open, exhibiting the arrangement of its internal parts, and the cap of the surplus box, attached thereto, elevated in an inclined position; and Figure 2 represents a similar view of a number of the comb-frames detached from the hive, showing the mode of suspending the same therein.

The construction, operation, and relative arrangement of the component parts of my invention are as follows:

A represents the casing of the hive, of the form shown in fig. 1, and supplied with the doors $a$ and $a^1$, the door $a$ being hinged to the apex of its roof and forming one side thereof, as seen in the drawing, and which is only for use when it is desired to remove the comb-frames, and having a hook, $a^2$, for fastening it in place when closed, and the door $a^1$ being hinged to one side of the rectangular portion of the hive, and furnished with the fastening or hook $a^3$, entering, when said door is closed, an eye secured to casing A, not shown, and an aperture, $a^4$, cut on its lower edge, by which the bees may enter or leave the hive without opening the said door $a^1$, which is only done when it is desired to remove the worms or insects from the trap of the hive.

Cut in the upper end of the sides of the said casing A are two ventilating openings, $a^5$, only one of which is shown, and which are supplied with lids or covers $a^6$.

$c$ represents the worm-trap, furnished with openings for entrance thereto of the worm or insect attempting to get into the hive, it being located directly in contact with the opening $a^4$ of the door $a^1$, and resting on the floor of the hive underneath the comb-frames.

C C′ represent two metallic rods, one of which passes through the upper extremity of the central part of the hive, and having one end entering an aperture cut in one side of casing A, and its opposite end passing through a corresponding aperture cut in the other side of the said casing and curved sufficiently to form a handle, by means of which it may be grasped and withdrawn, so as to release the upper ends of the said comb-frames therefrom, to assist in removing them from the hive.

The other rod, C′, is inserted in a similar manner in the sides of the casing A, as rod C, and is placed in the lower front part thereof, passing through apertures cut in the bars of one side of the comb-frames, for the purpose of retaining the same firmly in place in the hive. The said rod C′, being removable, may be also withdrawn, allowing the lower ends of the comb-frames to be released therefrom. Thus it will be seen, by means of the removable metallic rods C C′, that the comb-frames may be firmly held in the hive or removed therefrom.

D D are the comb-frames, constructed as clearly shown in the figures of the accompanying drawing, or, in other words, consisting of rectangular frames, the upper ends of which are conical in form, thus corresponding in shape with the case A, within which they are placed. The object of so constructing said frames is to enable the bees to secure or furnish a large quantity of honey in as short a time as possible, thus adapting the hive to late swarms of bees, as above intimated.

To the upper ends or apexes of the said comb-frames are attached the screw-eyes or hooks $d\ d$, to receive, and through which passes the rod C, for the purpose of suspending or hanging the said frames therefrom, and to assist in making them removable.

$d'\ d'$ represent a series of right-angular projections, having one end fastened in one side of the comb-frames D, and their opposite or free ends in contact with that side of the said frames opposite the said free ends, as seen in fig. 1, for the purpose of holding the comb-frames suitable distances apart.

E designates the "honey"-board, rigidly secured to and at right angles with the top or apex of the roof of the hive or casing A, and furnished with the oblong apertures $e\ e$, communicating with corresponding apertures cut in the roof of the hive, for the purpose of allowing the bees to pass from the comb-frames or lower chamber of the hive to the "surplus" box, which is designed to be placed on the honey-board E.

Hinged to one side of the said board, and supplied with the lifting-ring and screw-eye $f$, is the cap or casing F, covering the surplus box when resting on said board, and supplied with an opening, $f^1$, for the ingress and egress of the bees, said opening being furnished with a lid or door, $f^2$.

Having thus described my invention, I will indicate what I claim and desire to secure by Letters Patent in the following clause:

I claim—

The construction and arrangement of the comb-frames D D, provided with eyes $d\ d$, casing A, doors $a\ a^1$, trap $c$, honey-board E, provided with the hinged cap F, the removable rods $c\ c'$, when operating as and for the purposes described.

In testimony that I claim the foregoing, I have hereunto set my hand this 5th day of March, 1870.

HIRAM. F. ROHM.

Witnesses:
 MILTON P. MANN,
 ALEXANDER TATE.